June 2, 1925.
F. N. CONNET
FLOW METER
Filed Aug. 16, 1924
1,540,737
2 Sheets-Sheet 1
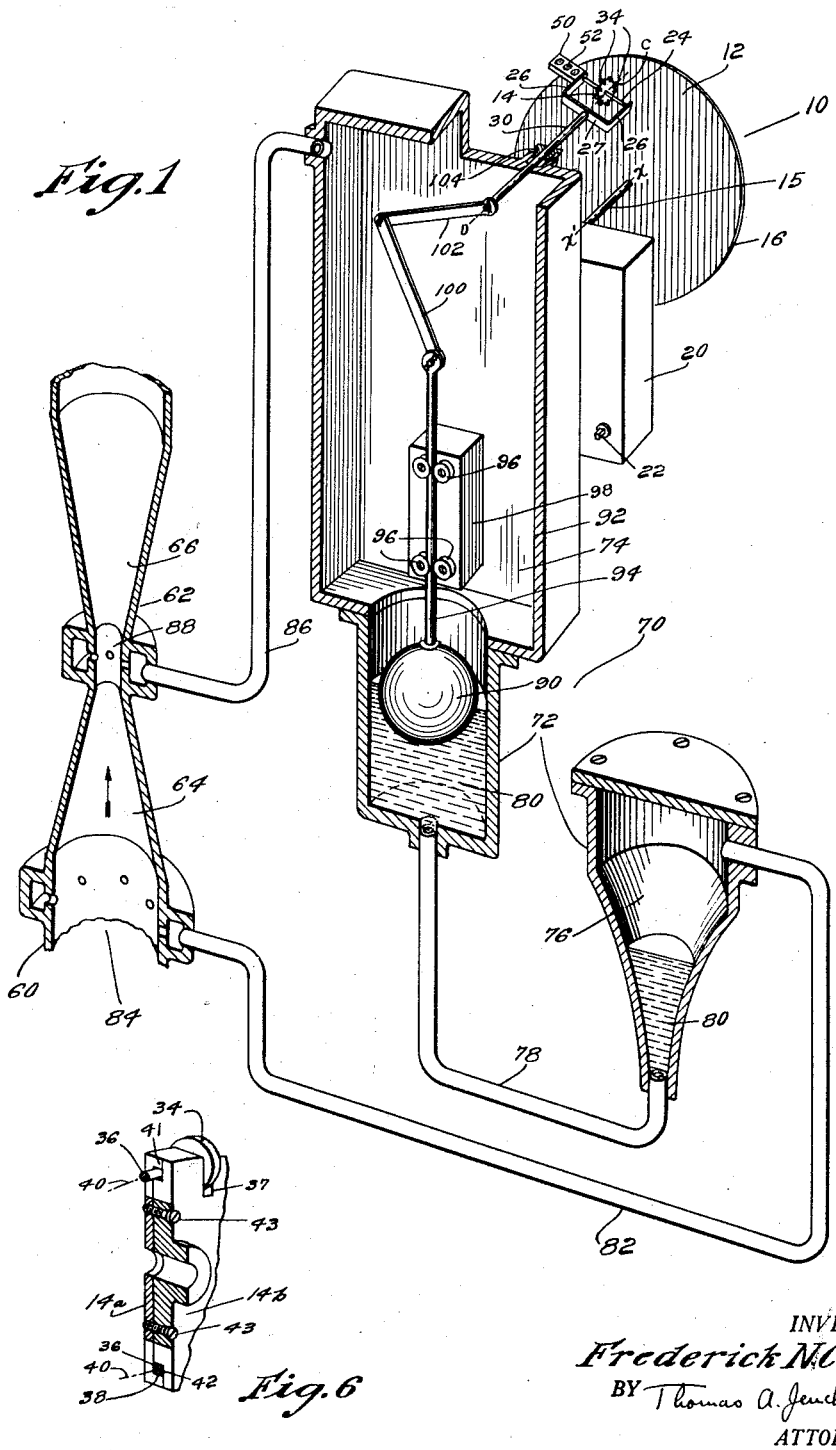
INVENTOR.
Frederick N. Connet
BY Thomas A. Jenckes Jr.
ATTORNEY.

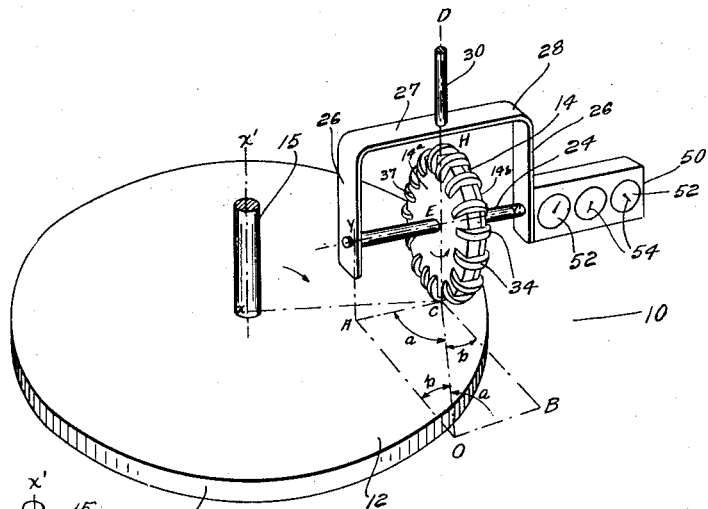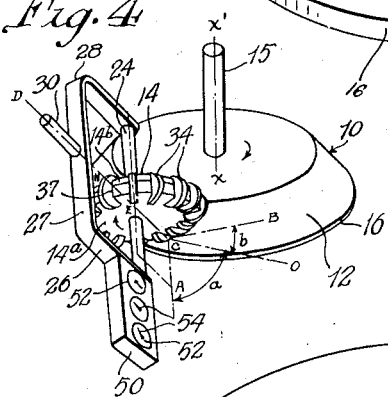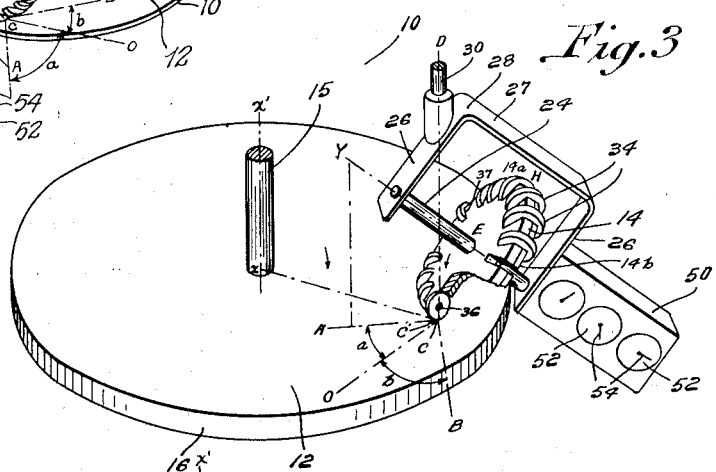

Patented June 2, 1925.

1,540,737

UNITED STATES PATENT OFFICE.

FREDERICK N. CONNET, OF PROVIDENCE, RHODE ISLAND, ASSIGNOR TO BUILDERS IRON FOUNDRY, OF PROVIDENCE, RHODE ISLAND, A CORPORATION OF RHODE ISLAND.

FLOW METER.

Application filed August 16, 1924. Serial No. 732,589.

*To all whom it may concern:*

Be it known that I, FREDERICK N. CONNET, a citizen of the United States, residing at 67 Whitmarsh St., Providence, in the county of Providence and State of Rhode Island, have invented certain new and useful Improvements in Flow Meters, of which the following is a specification.

My invention relates to flow meters containing integrators of the sine type.

I am aware that integrators of the sine type have been known for a long time, but have heretofore been avoided in flow meters commercially, on account of the effects of the slipping or rubbing motion of the periphery of the integrating wheel upon the driving surface, the rapid wearing of the wheel and the driving surface, the relatively large power required to drive said integrating wheel and the excessive force required to actuate the integrating mechanism.

It is obvious that by modifying the construction of a flow meter so that it may include an integrator of the sine type, I have provided a device easy and cheap to construct, neat in appearance and wherein the integration is more positively actuated than in former types of integrating flow meters.

I am also aware that small rollers have been used to substantially form the periphery of the wheel in mechanical integrators of another type in flow meters, specifically to permit axial motion of the integrator wheel radially over the driving surface without rubbing or slipping, and in speed changing devices.

I take a wheel of this type wherein the rollers substantially form the periphery of the wheel and by embodying it into an integrator of the sine type, I make it practical for flow meter purposes by substantially eliminating all wear between the wheel and driving surface, greatly reduce the driving power necessary to operate and the force required to position the integrating member.

My invention, therefore, broadly comprises in a flow meter the combination of a driving surface, a wheel driven by contact with said surface moving relative to the surface and having a plurality of relatively small rollers mounted thereon with their axes substantially forming the periphery thereof, a counter mechanism driven by said wheel and means to twist said wheel about the perpendicular to the driving surface at the point of contact, so that the plane perpendicular to the driving surface containing the axis of the wheel, forms an angle with the direction of motion of the driving surface at the point of contact whose sine is proportional to the rate of flow, whereby the component movement of the driving surface in a plane with the axis of the wheel is eliminated without rubbing and the periphery of said wheel rotates with the component movement of the driving surface in the direction of the peripheral plane of the wheel at the point of contact, whereby the wheel revolves a distance per unit movement of the driving surface proportional to said sine and to the rate of flow to be integrated to cause the revolution counter to register said total quantity of flow.

The main object of my invention, therefore, is to provide the combination of a flow meter with a practical integrator of the sine type with its attendant advantages by suitably modifying the flow meter elements.

These and such other objects of my invention as may hereinafter appear, will be best understood from a description of the accompanying drawings which illustrate various embodiments of quantity of flow integrators.

In the drawings, Fig. 1 is a diagrammatic view partially shown in section of a quantity of flow integrator, comprising a Venturi meter tube located in the conduit through which the fluid flows to create a pressure differential varying with the rate of flow and a Venturi meter indicator actuated thereby to twist the wheel of the integrator so that said integrator moves at a rate proportionately to the rate of flow.

Fig. 2 is a perspective view of the preferred embodiment of the integrator portion of my invention, wherein the driving surface comprises the side of a revolving disc, and the diameter of the driven wheel is perpendicular to the driving surface at the point of contact.

Fig. 3 is a perspective view similar to Fig. 2 of an embodiment similar to that shown in Fig. 2, but where the wheel is inclined, so that the diameter thereof is not perpendicular to the driving surface at the point of contact.

Fig. 4 is a perspective view similar to Figs. 2 and 3 of an embodiment similar to that shown in Figs. 2 and 3, but where the driving surface comprises the side of a revolving cone and the diameter of the driven wheel is perpendicular to the driving surface at the point of contact.

Fig. 5 is a perspective view similar to Figs. 2, 3 and 4 of an embodiment similar to that shown in Fig. 2, but where the driving surface is the cylindrical surface of a revolving disc and the diameter of the driven wheel is perpendicular to the driving surface at the point of contact.

Fig. 6 is a detailed perspective view, partially shown in section of the wheel, showing the means I employ for mounting the rollers thereon.

In the drawings, wherein like characters of reference indicate like parts throughout, 10 generally indicates my integrating device, 12 the driving surface thereof and 14 the driven member. As explained, integrators of the sine type are especially adapted for integrating expressions of the area type, where the quantity $y$ to be integrated may be expressed as a function of another quantity $x$ and the integration mathematically expressed as the total area $$A = \int_{x_1}^{x_2} y.dx$$

and especially for quantity integrators where time is a factor, when the formula becomes total quantity $$Q = \int_{t_1}^{t_2} R.dt.$$

Since in my preferred embodiment the formula involves time, I have shown the driving element as a member 16 containing the driving surface 12, rotating at a constant speed.

In my preferred embodiment, which, as explained, comprises a quantity of flow integrator 10, the driving surface 12 comprises a side 12 of a disc 16 mounted on the shaft 15 which is revolved at constant speed by the clockwork mechanism contained in the box 20. 22 indicates the winding lug thereof, and the line $x$—$x^1$ indicates the axis of the shaft 15 on which the driving member 16 is mounted.

As explained, 14 indicates the driven member, which in my preferred embodiment comprises the wheel 14. Said wheel 14 is mounted on the shaft 24. The shaft 24 is revolubly mounted on the arms 26, extending forward at each end of the base 27 of the bracket 28, attached to the end of the shaft 30, which is preferably mounted on the twisting means later to be described. The shaft 30 is attached to the bracket 28 perpendicularly to the driving surface 12 at the point of contact C, and in the preferred embodiments shown in Figs. 2, 4 and 5, is also perpendicular to the base 27 of the bracket 28. $y$—$y^1$ represents the axis of the shaft 24, and hence the axis of the driven wheel 14. The wheel 14 contacts the driving disc 16 at C.

While in my preferred embodiment shown in Figs. 1, 2 and 3, the driving surface 12 comprises a side 12 of the rotating disc 16, it is obvious that it may comprise the side 12 of a conical rotating driving member 16, as shown in Fig. 4, the cylindrical surface 12 of a disc 16 as shown in Fig. 5, or any surface 12 moving or rotated at a constant speed.

While in my preferred embodiment shown in Figs. 1 and 2, and in the embodiments shown in Figs. 4 and 5, the diameter CH of the wheel 14 is perpendicular to the driving surface 12 at the point of contact C, it is obvious that it may be inclined at any angle to any type of driving surface 12 employed, as shown at C'H in Fig. 3 inclined to the flat side 12 of the disc 16, without departing from my invention.

The main feature of my invention is to provide an integrating flow meter, with a sine type of integrator containing a wheel 14 with a plurality of relatively small rollers 34. These rollers 34 are mounted so close together that their axes 40 substantially form the periphery of the wheel, and are constructed so as to be capable of unrestrained rotation about their axes 40 in planes normal to the plane of rotation of said wheel 14. It is obvious that said rollers 34 are thus constrained against axial motion relative to the periphery of said wheel and are adapted to provide a pure rolling contact with said driving surface 12 to take up and eliminate the entire component velocity of the driving surface 12 in a plane with the axis of the wheel as will be explained. While any means of mounting the small peripheral rollers 34 on the periphery of the wheel 14 may be employed, in my preferred embodiment, they comprise the small washers 34 which rotate on the wire shaft 36 and are held in spaced relationship in the radial slots 37 made therefor on the periphery of the wheel 14 (Fig. 6). The wheel 14 is preferably made in two cooperating portions 14$^a$ and 14$^b$, so constructed that when assembled they form an annular channel 38 concentric with the axis $y$—$y'$ of the wheel to receive the wire 36 therein. The portion 14$^a$ is provided with an annular flange 41 projecting sidewise near the periphery thereof, adapted to register in a cooperating annular cutaway portion 42 of slightly greater radial depth than said flange 41 cut in the cooperating side of the portion 14$^b$ near the periphery thereof. The method of assembly is to form the wire shaft 36 into a complete circle of the proper diameter, thread the small washers 34 on to the wire 36 and lay the wire 36 on the annular cutaway portion 42 of the portion 14b of the wheel, with the small rollers 34 registering in their respective slots 37, place the portion 14a in position against the portion 14b, the flange 41 thereby forming the channel 38 to enclose the wire 36, and secure said portions 14a and 14b together by the screws 43.

In this integrating flow meter, the integrator has the usual counter mechanism 50 actuated thereby, preferably mounted on an arm 26 of the bracket 28. Said counter mechanism 50 contains the usual dials 52 and pointers 54.

In the drawings CO=direction of motion of driving surface at point of contact C. CB=direction of motion of the wheel 14 at point of contact C and CA=projection of wheel axis $y$—$y'$ on the driving surface 12. Angle $a$ = the angle of twist of $y$—$y'$ about the axis of twist CD perpendicular to the driving surface 12 at the point of contact C. The angle $b=90°-a$. Though in my preferred embodiment, I twist the axis $y$—$y'$ in a clockwise direction, it is obvious that with changes in my mechanism, the axis $y$—$y'$ may be twisted in any direction about CD, the perpendicular to the driving surface at the point of contact C.

The sine integrator is provided with means to twist said wheel 14 about the axis of twist CD perpendicular to the driving surface 12 at the point of contact C to that angle $a$, whose sine is proportional to the rate of flow; thus in the embodiment shown, so that the plane CAYE perpendicular to the driving surface, containing the axis of the wheel $y$—$y'$ forms an angle $a$ with the direction of motion of the driving surface CO at the point of contact C, whose sine is proportional to the rate of flow of fluid in a conduit.

In my preferred embodiment shown in Fig. 1, said means is as follows: Assume that fluid is flowing through the conduit 60 in the direction of the arrow. I attach to said conduit 60 a pressure differential producing element such as the standard Venturi meter tube 62, having the usual converging cone 64 and diverging cone 66, though it is obvious that other equivalent devices such as Pitot tubes, orifices, etc. may be employed for this purpose, I provide a standard Venturi meter indicator 70, containing the usual manometer 72, though it is obvious that other equivalent devices may be employed. Said manometer 72 has the usual low pressure chamber 74 connected to the usual high pressure chamber 76 by the usual pipe 78 and contains the usual indicating fluid 80 preferably mercury. A pipe 82 connects the inlet 84 of the Venturi meter tube 62 with the high pressure chamber 76, and a pipe 86 connects the throat 88 of the Venturi meter tube 62 with the low pressure chamber 74 as usual. A float 90 rests as usual on the indicating fluid mercury 80 in the low pressure chamber 74 and the low pressure chamber 74 is enlarged to contain means to convert the up and down reciprocating motion of the float 90 on the fluid 80 as it changes with changes in pressure differential produced by varying rates of flow in the conduit 60 to the rotary motion desired to twist the shaft 30 to twist the wheel 14 relative to the driving surface 12 whereby the sine (AO/CO) of the angle $a$ (angle OCA) may vary proportionately to the rate of flow. I therefore preferably enlarge the upper portion of the low pressure chamber 74 into the compartment 92. The float 90 has extending upwardly therefrom the rod 94 constrained by the rollers 96, mounted on the support 98 attached to the side of the compartment 92, to move up and down vertically in said compartment. A link 100 is pivoted to the upper end of the rod 94, which has its opposite end pivotally attached to the crank arm 102 keyed at right angles to the shaft 30. Said shaft 30 extends through and is supported by the stuffing box 104 in the side of the compartment 92, and has the bracket 28 with wheel shaft 24 mounted thereon on the end thereof as heretofore explained.

As explained, in order to provide the combination of a flow meter with the form of integrator of the sine type I employ, it is necessary to so modify the construction of an ordinary flow meter so that the sine of the angle of twist of the axis of the integrating wheel will vary proportionately to the rate of flow of fluid in a conduit. Though this modification may be accomplished in any suitable manner, in my preferred embodiment, for this purpose I preferably so shape the manometer and proportion the link 100 and crank 102 that the sine will vary proportionately to the rate of flow. I thus preferably taper the high pressure chamber 76 outwardly as at 77 away from the pipe 78 according to the usual mathematical formula of achieving this end to form the trumpet shaped well 79 as the lower portion of the high pressure chamber 76.

The operation of my invention is obvious from the above description. The angle $a$ equals zero when the plane CAYE perpendicular to the driving surface containing the axis $y$—$y'$ of the wheel 14, contains CO the direction of driving motion of the driving surface at the point of contact with the wheel 14. When the angle $a$ equals O, although the small rollers 34 revolve, the wheel will not turn and thus no integration will take place. In my preferred embodiment, the float 90 would drop to revolve the wheel 14 so that the angle $a$ equals zero when there is no flow through the conduit 60.

To more readily explain the functioning of my apparatus, in Fig. 2 I have drawn the parallelogram of resolution of component velocities created by the contact of the driving surface 12 with the driven wheel 14 at the point of contact C. As explained, CO equals direction of motion of the driving surface 12 at the point of contact C, this line CO being tangent to the disc 16 at C. When the velocity CO of the driving surface 12 however relatively created, is contacted by the wheel 14 with the plane CAYE perpendicular to the driving surface containing the axis $y$—$y'$ thereof not containing the line CO, it is obvious that the velocity of the point C on the driving surface 12 is resolved into two components, the component velocity of the driving surface in the direction of the peripheral plane of the wheel at the point of contact, thus CB, and the axial component velocity of the driving surface, CA, along the projection of the axis $y$—$y'$ on the driving surface at the point of contact C. Working out the parallelogram of velocities we have the line BO parallel to CA, AO parallel to CB and the line CO as the diagonal thereof. As AO is perpendicular to CA in the right triangle ACO, sine $a$ equals AO/CO and in turn equals CB/CO. It is obvious that it is the component CA that has caused slipping, rubbing or sliding between the driving and driven surfaces and that has limited the commercial usefulness of sine integrators, and it is also obvious that by giving the wheel 14 the component velocity CB perfect sine integration is secured. As the peripheral rollers 34 by their unrestrained rotation eliminate the undesirable component velocity CA, the wheel 14 will rotate at the component velocity of the driving surface CB in the direction of the peripheral plane thereof to create a theoretically correct sine integrator and as AO equals CB said wheel will rotate proportionately to the sine $a$ or AO/CO. It is obvious that where the diameter CH of the wheel is perpendicular to the driving surface 12 at the point of contact C, as shown in Figs. 1, 2, 4 and 5 that the projected axis AC of $y$—$y'$ forms the angle $a$ with CB, but that where the diameter CH is not perpendicular to the driving surface at C as shown in Fig. 3 or as may be with any driving surface that we must take the plane CAYE perpendicular to the driving surface containing the axis $y$—$y'$ to form the desired angle $a$ with CO.

While as stated, any means may be provided to twist the wheel 14 until the angle $a$ is formed, whose sine is proportional to the value of $y$ at the corresponding value of $x$, or until sine $a$ is proportional to the quantity to be integrated, the wheel 14 is twisted in my preferred embodiment until the sine $a$ is proportional to the rate of flow of fluid in the conduit 60, as follows: With the increase in the rate of flow in the conduit 60, the Venturi meter tube 62 will create a pressure differential in the manometer 72 corresponding to the rate of flow. As this differential increases, it will cause the fluid 80 in the low pressure chamber 74 to rise, thereby raising the float 90 and rod 94. This raising of the rod 94 acting through the medium of the link 100 and crank arm 102, will cause the shaft 30 to twist the wheel 14 to increase the angle $a$ until the sine $a$ is proportionate to the rate of flow. As the rate of flow decreases, in similar manner will the angle $a$ be decreased.

When referring to direction of motion in the claims, I employ the words driving surface to mean the plane tangent to the driving surface at the point of contact with the driven surface.

It is understood that my invention is not limited to the specific embodiments shown and that various deviations may be made therefrom without departing from the spirit and scope of the appended claims.

What I claim as new and desire to secure by Letters Patent is:

1. In an integrating flow meter having conduit containing a pressure differential producing element and reciprocal means actuated by said pressure differential, a driving surface revolving at a constant velocity, a wheel driven by contact with said surface having a plurality of relatively small rollers mounted thereon with their axes substantially forming the periphery thereof and being capable of constrained rotation about their axes in planes normal to the plane of rotation of wheel and constrained against axial motion relative to the periphery of said wheel to provide a pure rolling contact with said driving surface to prevent any rubbing of the wheel thereover, a counter mechanism driven by said wheel, means to mount said wheel in contact with said driving surface to permit a twisting motion thereof, and means to convert the reciprocal motion of said reciprocal means to a twisting motion of said wheel and wheel mounting means to twist said wheel about the perpendicular to the driving surface at the point of contact so that the plane perpendicular to the driving surface at the point of contact containing the axis of the wheel forms an angle with the direction of motion of the driving surface whose sine is proportional to the rate of flow of fluid in the conduit, whereby the component velocity of the driving surface in a plane with the axis of the wheel is eliminated without rubbing and the periphery of said wheel rotates at the component velocity of the driving surface in the direction of the peripheral plane of the wheel at the point of contact whereby the wheel revolves at a rate proportionately to said sine and also to the rate of flow to cause the revolution counter to register the total quantity of flow.

2. In an integrating flow meter having conduit containing a pressure differential producing element and reciprocal means actuated by said pressure differential, a driving surface revolving at a constant velocity, a wheel driven by contact with said surface having a plurality of relatively small rollers mounted thereon with their axes substantially forming the periphery thereof, a counter mechanism driven by said wheel, means to mount said wheel in contact with said driving surface to permit a twisting motion thereof and means to convert the reciprocal motion of said reciprocal means to a twisting motion of said wheel and wheel mounting means to twist the axis of said wheel about the perpendicular to the driving surface at the point of contact so that the plane perpendicular to the driving surface containing the axis of the wheel forms an angle with the direction of motion of the driving surface whose sine is proportional to the rate of flow of fluid in the conduit.

3. In an integrating flow meter having conduit containing a pressure differential producing element, a manometer containing a pressure responsive liquid, the height thereof being controlled by said pressure differential and a float resting on the surface of the liquid in one leg thereof having a rod extending therefrom constrained to reciprocate in a vertical direction, a shaft, an arm rigidly secured to said shaft, a link connecting said float rod and arm, an axle mounted on a bracket on the opposite end of said shaft, a driving surface rotating at a constant velocity, a wheel on said axle driven by contact with said surface having its diameter at its point of contact perpendicular to the driving surface and having a plurality of relatively small rollers mounted on the periphery thereof, a counter mechanism driven by said wheel, one leg of the manometer being so tapered that as the axis of said wheel is twisted about the perpendicular to the driving surface at the point of contact, the plane perpendicular to the driving surface containing the axis of the wheel forms an angle with the direction of motion of the driving surface whose sine is proportional to the rate of flow of fluid in the conduit.

4. In an integrating flow meter having conduit containing a pressure differential producing element, a manometer containing a pressure responsive liquid, the height thereof being controlled by said pressure differential and a float resting on the surface of the liquid in one leg thereof having a rod extending therefrom constrained to reciprocate in a vertical direction a shaft, an arm rigidly secured to said shaft, a link connecting said float rod and arm, an axle mounted on a bracket on the opposite end of said shaft, a driving disk rotating at a constant velocity, a wheel on said axle driven by contact with said disk having a plurality of relatively small rollers mounted on the periphery thereof, a counter mechanism driven by said wheel, the manometer being so shaped that as the axis of said wheel is twisted about the perpendicular to the driving disk at the point of contact the plane perpendicular to the driving disk containing the axis of the wheel forms an angle with the direction of motion of the driving surface whose sine is proportional to the rate of flow of fluid in the conduit.

5. In an integrating flow meter having pressure differential producing element attached to a conduit, an integrator of the sine type having a friction driven wheel, small rollers substantially forming the periphery of said wheel, and means actuated by said pressure differential producing element to continuously twist said friction driven wheel to an angle whose sine is proportional to the rate of flow in said conduit.

In testimony whereof I affix my signature.

FREDERICK N. CONNET.